US012722781B2

(12) United States Patent
Vogel et al.

(10) Patent No.: US 12,722,781 B2
(45) Date of Patent: Sep. 1, 2026

(54) COLLAPSIBLE SELF-SUPPORTING HUMAN AND/OR NON-HUMAN CARGO TRANSPORT DEVICE

(71) Applicant: AIRBUS HELICOPTERS DEUTSCHLAND GMBH, Donauworth (DE)

(72) Inventors: Dominik Vogel, Langweid (DE); Christoph Heider, Rain am Lech (DE); Alexandru Dinca, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 544 days.

(21) Appl. No.: 18/368,356

(22) Filed: Sep. 14, 2023

(65) Prior Publication Data

US 2024/0208649 A1 Jun. 27, 2024

(30) Foreign Application Priority Data

Dec. 26, 2022 (EP) .................................... 22216677

(51) Int. Cl.
*B64D 1/22* (2006.01)
*A62B 1/02* (2006.01)
(Continued)

(52) U.S. Cl.
CPC .................. *B64D 1/22* (2013.01); *A62B 1/02* (2013.01); *B66C 1/16* (2013.01); *B64C 27/04* (2013.01)

(58) Field of Classification Search
CPC .. A62B 1/02; B64D 1/22; B66C 1/127; B66C 1/16; B64C 27/04; B65D 7/26; B65D 88/522; B66F 11/04
See application file for complete search history.

(56) References Cited

U.S. PATENT DOCUMENTS 1,408,940 A 3/1922 Harley
3,421,165 A 1/1969 Pugh
(Continued)

FOREIGN PATENT DOCUMENTS

CH 703417 A2 1/2012
CN 205114816 U 3/2016
(Continued)

OTHER PUBLICATIONS

European Search Report for European Application No. EP 22216677.9, Completed by the European Patent Office, Dated May 15, 2023, 6 pages.

*Primary Examiner* — George Sun
(74) *Attorney, Agent, or Firm* — BROOKS KUSHMAN P.C.

(57) ABSTRACT

A collapsible self-supporting human and/or non-human cargo transport device for use with a rotorcraft, comprising: an inner cargo storage area for accommodating human and/or non-human cargo for transportation; a self-supporting skeletal frame, and collapsible cargo securing means mounted to the self-supporting skeletal frame for delimiting the inner cargo storage area. The self-supporting skeletal frame comprises a collapsible platform support structure, a collapsible spreading structure, a telescopic rod connecting the collapsible platform support structure to the collapsible spreading structure, an attachment connected to the telescopic rod to enable attachment of the self-supporting skeletal frame to a rotorcraft, and a plurality of tensioning cables connecting the attachment to the collapsible spreading structure and the collapsible platform support structure.

15 Claims, 8 Drawing Sheets

(51) Int. Cl.

| | |
|---|---|
| ***B64C 27/04*** | (2006.01) |
| ***B66C 1/16*** | (2006.01) |

(56) References Cited

U.S. PATENT DOCUMENTS

| | | | | |
|---|---|---|---|---|
| 3,827,745 | A * | 8/1974 | Pugh | B66C 1/127 294/77 |
| 4,138,077 | A | 2/1979 | Okumura | |
| 6,336,260 | B1 | 1/2002 | Mauthner | |
| 6,598,831 | B1 * | 7/2003 | Tardy | A62B 99/00 441/83 |
| 7,252,315 | B2 * | 8/2007 | Liberato | B66C 1/127 182/142 |
| 10,398,939 | B1 | 9/2019 | Siegel | |
| 2006/0249330 | A1 * | 11/2006 | Tardy | B64D 1/22 244/137.2 |
| 2021/0047149 | A1 | 2/2021 | Mckay | |

FOREIGN PATENT DOCUMENTS

| | | | |
|---|---|---|---|
| CN | 112047228 | A | 12/2020 |
| EP | 1100720 | A1 | 5/2001 |
| EP | 1646562 | A1 | 4/2006 |
| EP | 3037133 | B1 | 6/2018 |
| EP | 3781480 | A1 | 2/2021 |
| GB | 2340101 | B | 2/2002 |
| WO | 0007877 | A1 | 2/2000 |
| WO | 2005005253 | A1 | 1/2005 |
| WO | 201991669 | A1 | 5/2019 |
| WO | 2019204405 | A1 | 10/2019 |

* cited by examiner 1
1a
2b
2
2c
5
4
7a
3
2a
6
7
8
8a
9
9c
10

COLLAPSIBLE SELF-SUPPORTING HUMAN AND/OR NON-HUMAN CARGO TRANSPORT DEVICE

CROSS-REFERENCE TO RELATED APPLICATIONS

This application claims priority to European patent application No. EP 22216677.9 filed Dec. 26, 2022, the disclosure of which is incorporated in its entirety by reference herein.

TECHNICAL FIELD

The present disclosure is related to a human and/or non-human cargo transport device for use with a rotorcraft, which is embodied to permit transport of human and/or non-human external cargo outside of the rotorcraft.

BACKGROUND

Non-human cargo transport devices for use with a rotorcraft, which are embodied to permit transport of non-human external cargo outside of the rotorcraft, may be provided in the form of hooks that are attached to ropes or cables which are connected to the rotorcraft. Such hooks may be embodied as simple hooks, safety hooks, snap hooks, or even more complicated forms of hooks. For instance, the document EP 3 781 480 A1 describes a perforated capsule hook with a perforated housing which is attachable to non-human external cargo and remains after retraction from the non-human external cargo in a comparatively stable state during high speed flight due to a plurality of holes and perforations provided in the perforated housing.

Furthermore, human and/or non-human cargo transport devices for use with a rotorcraft, which are embodied to permit transport of human and/or non-human external cargo outside of the rotorcraft, are available in a wide range of variations and usually attachable to ropes or cables which are connected to the rotorcraft. More generally, in civil, parapublic and military missions, such ropes or cables with human and/or non-human cargo transport devices may e.g. be used for rapidly inserting and/or extracting persons and/or cargo into/from various environments, in particular environments that do not permit landing of the rotorcraft. Such environments may e.g. include, maritime environments such as offshore as well as oil and gas platforms, and terrestrial environments such as land in vegetated areas, mountains and urban territory, or even e.g. flooded areas in catastrophic scenarios.

In general, three different types of human and/or non-human cargo transport devices are currently available: rigging plates or loops of so-called SPIE (Special Patrol Insertion/Extraction) rigs, personal transport nets, and personal transport platforms, all of which are attachable to associated attachment interfaces such as safety hooks or snap hooks provided at associated ropes or cables of a given rotorcraft.

More specifically, in SPIE rigs the rigging plates or loops may be distributed over the length of associated ropes in order to form lashing points for attachment of human or non-human cargo. By way of example, the documents CN 112 047 228 A, CN 205 114 816 U, EP 3 037 133 B1, GB 2 340 101 B, and U.S. Pat. No. 1,408,940 A describe illustrative ropes with rigging plates or loops that form lashing points. Other rigging plates which are configured to provide multiple lashing points and which are attachable to attachment interfaces provided at associated ropes or cables are e.g. described in the documents US 2021/0047149 A1, U.S. Pat. No. 10,398,939 B1, and U.S. Pat. No. 6,336,260 B1.

Personal transport nets, in turn, are available in a wide range of variations, as e.g. acknowledged in the documents U.S. Pat. Nos. 3,827,745 A and 3,421,165 A. By way of example, the document U.S. Pat. No. 3,421,165 A describes a net assembly that includes a base spreader ring and an upper spreader ring with flexible non-elastic lacings connecting the spreader rings and forming an enclosing net structure provided with an opening at a forward portion through which an individual or an inanimate object may enter the net. A rear portion of the base spreader ring is disposed at a lower elevation than the forward portion to provide a pocket in the net structure into which a person may nestle while the net assembly is raised by a lifting cable.

Similarly, personal transport platforms are also available in a wide range of variations and e.g. described in the documents WO 2019/91669 A1, EP 1 646 562 A1, and EP 1 100 720 A1. By way of example, the document EP 1 100 720 A1 describes a personal transport platform that may be suspended from a rotorcraft for rescuing people or equipment and that forms a link between the rotorcraft and a pod capable of being folded and unfolded, which is formed by a frame associated with a flexible support, such as a net. The frame comprises, fixed to the link, a central mast connected to mobile means bearing the flexible support, for folding and unfolding the mobile means and the flexible support about the central mast.

However, all the above-described human and/or non-human cargo transport devices for use with a rotorcraft do not provide a self-supporting inner cargo storage area that is easily accessible for loading and unloading of human and/or non-human cargo. The documents U.S. Pat. No. 4,138,077 and CH703417 were cited.

SUMMARY

Based on the limitations and drawbacks of the prior art, an objective is to provide a new human and/or non-human cargo transport device for use with a rotorcraft, which comprises a self-supporting inner cargo storage area that is easily accessible for loading and unloading of human and/or non-human cargo. More particularly, the new human and/or non-human cargo transport device should preferably keep its shape in upright standing position in every situation during use to facilitate loading of human and/or non-human cargo and, furthermore, provide a closed internal space to ensure safe transport of human cargo without prior instruction, training, or special safety equipment, such as personal protective equipment (PPE).

This object is solved by a collapsible self-supporting human and/or non-human cargo transport device for use with a rotorcraft, which comprises the features of claim 1. More specifically, according to the present disclosure a collapsible self-supporting human and/or non-human cargo transport device for use with a rotorcraft comprises an inner cargo storage area for accommodating human and/or non-human cargo for transportation, a self-supporting skeletal frame, and collapsible cargo securing means mounted to the self-supporting skeletal frame for delimiting the inner cargo storage area. The self-supporting skeletal frame comprises a collapsible platform support structure, a collapsible spreading structure, a telescopic rod connecting the collapsible platform support structure to the collapsible spreading structure, an attachment connected to the telescopic rod to enable attachment of the self-supporting skeletal frame to a rotorcraft, and a plurality of tensioning cables connecting the attachment to the collapsible spreading structure and the collapsible platform support structure.

Advantageously, the inventive collapsible self-supporting human and/or non-human cargo transport device complies with all current Federal Acquisition Regulation (FAR) requirements and military standards. More particularly, the collapsible self-supporting human and/or non-human cargo transport device for use with a rotorcraft according to the present disclosure includes a self-supporting skeletal frame which keeps its shape in upright standing position in almost every situation during use, which facilitates loading of human and/or non-human cargo. Furthermore, the inventive collapsible self-supporting human and/or non-human cargo transport device ensures a safe transport, especially of human cargo and, in particular, of injured people or wounded persons.

Safe and secure use for a safe and secure transport with the inventive collapsible self-supporting human and/or non-human cargo transport device, e.g. in rescue operations for human cargo, does advantageously not require detailed knowledge and training on evacuation equipment. In fact, securing means, preferably in the form of a security transport net, are mounted to the self-supporting skeletal frame to form an enclosed environment with a fixed, closed internal space for a respective device body of the collapsible self-supporting human and/or non-human cargo transport device to guarantee safe and secure transport of human cargo transported inside the closed internal space. Preferably, the device body of the collapsible self-supporting human and/or non-human cargo transport device is expandable from a collapsed state up to an approximate average human height in an expanded state and preferentially allows transportation of up to ten persons within the closed internal space. Furthermore, it is preferably collapsible in both height and radial directions from the expanded state to the collapsed state to reduce significantly a respectively required storage space, e.g. for storage in the collapsed state in a given rotorcraft.

Advantageously, the self-supporting skeletal frame with the telescopic rod is adapted to allow the device body to be self-supporting, with or without a taut suspension rope. Thus, e.g. human cargo may simply step into the inner cargo storage area while remaining in upright position.

In particular, a carrier platform may be mounted on a respective collapsible platform support structure that provides stiffening support to the self-supporting skeletal frame by means of suitable associated mechanics. Any human or non-human cargo that is loaded onto the carrier platform further opens, or keeps open, the collapsible platform support structure by its weight and further facilitates setting up of the inventive collapsible self-supporting human and/or non-human cargo transport device for loading of additional human and/or non-human cargo. Preferably, a continuous textile floor, such as a cloth or a canvas, may be used with the carrier platform instead of sewn straps to realize a comfortable use. Optionally, the continuous textile floor may be locally reinforced as required.

Advantageously, the device body may be quickly and easily attached to or released from a load hook of a given rotorcraft via a load-bearing rope or cage. In addition, a highly redundant system of the inventive collapsible self-supporting human and/or non-human cargo transport device is enabled through the use of several load-bearing, i.e. frame tensioning cables and/or ropes. The frame tensioning cables preferably connect the collapsible spreading structure and the collapsible platform support structure and are preferably embodied to be load-bearing to provide a redundant design. Thus, the telescopic rod is advantageously only used to establish the ability of the self-supporting skeletal frame to stand in a self-supporting manner upright on its own and is essentially unloaded in flight. If desired, the telescopic rod may be adapted for providing an increased floatability of the inventive collapsible self-supporting human and/or non-human cargo transport device to enable application for sea insertion/extraction operations.

In an illustrative realization, a torque-free load-bearing behavior of the collapsible platform support structure is enabled. Therefore, the collapsible platform support structure comprises a star-shaped supporting structure with e.g. five pivotable carrying arms spreading outward from a center of the device body, which are partially decoupled to the central telescopic rod through the use of e.g. a support ring. When the platform is loaded unevenly, the forces are carried in a ring shape by a cable spanning all segments.

Furthermore, the collapsible self-supporting human and/or non-human cargo transport device is preferably embodied to have additional attachment points for safety equipment or to allow human cargo to stay on the outside of the inner cargo storage area during transportation, e.g. in military use.

According to some aspects, the telescopic rod comprises at least a first telescopic rod section and a second telescopic rod section, wherein the first telescopic rod section and the second telescopic rod section are movable relative to each other in an unblocked state, wherein the collapsible spreading structure is mounted to the first telescopic rod section, and wherein the collapsible platform support structure is mounted to the second telescopic rod section.

According to some aspects, the collapsible platform support structure comprises a carrying ring slidably mounted on the telescopic rod.

Furthermore, the collapsible platform support structure may comprise a plurality of pivotable carrying arms.

The plurality of pivotable carrying arms may be pivotally mounted to the carrying ring.

According to some aspects, the carrying ring is slidably mounted on the second telescopic rod section, wherein the second telescopic rod section is provided with an end stop forming a mechanical end stop for a sliding movement of the carrying ring.

According to some aspects, the collapsible spreading structure comprises a support ring rigidly mounted to the telescopic rod.

Furthermore, the collapsible spreading structure may comprise a plurality of pivotable support arms.

In particular, the plurality of pivotable support arms may be mounted pivotally to the support ring.

According to some aspects, the support ring is rigidly mounted on the first telescopic rod section.

Furthermore, the support ring and the carrying ring may be movable in opposite directions by means of the telescopic rod to permit expansion of the self-supporting skeletal frame.

Alternatively, or in addition, the support ring and the carrying ring may be arranged on opposed axial ends of the telescopic rod in expanded state of the telescopic rod, and the support ring and the carrying ring may be arranged close to each other in collapsed state of the telescopic rod.

According to some aspects, the collapsible self-supporting human and/or non-human cargo transport device further comprises blocking and securing means configured for blocking the telescopic rod at least in expanded state.

Furthermore, the blocking and securing means may comprise a lock pin.

According to some aspects, the collapsible cargo securing means comprises a security transport net.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
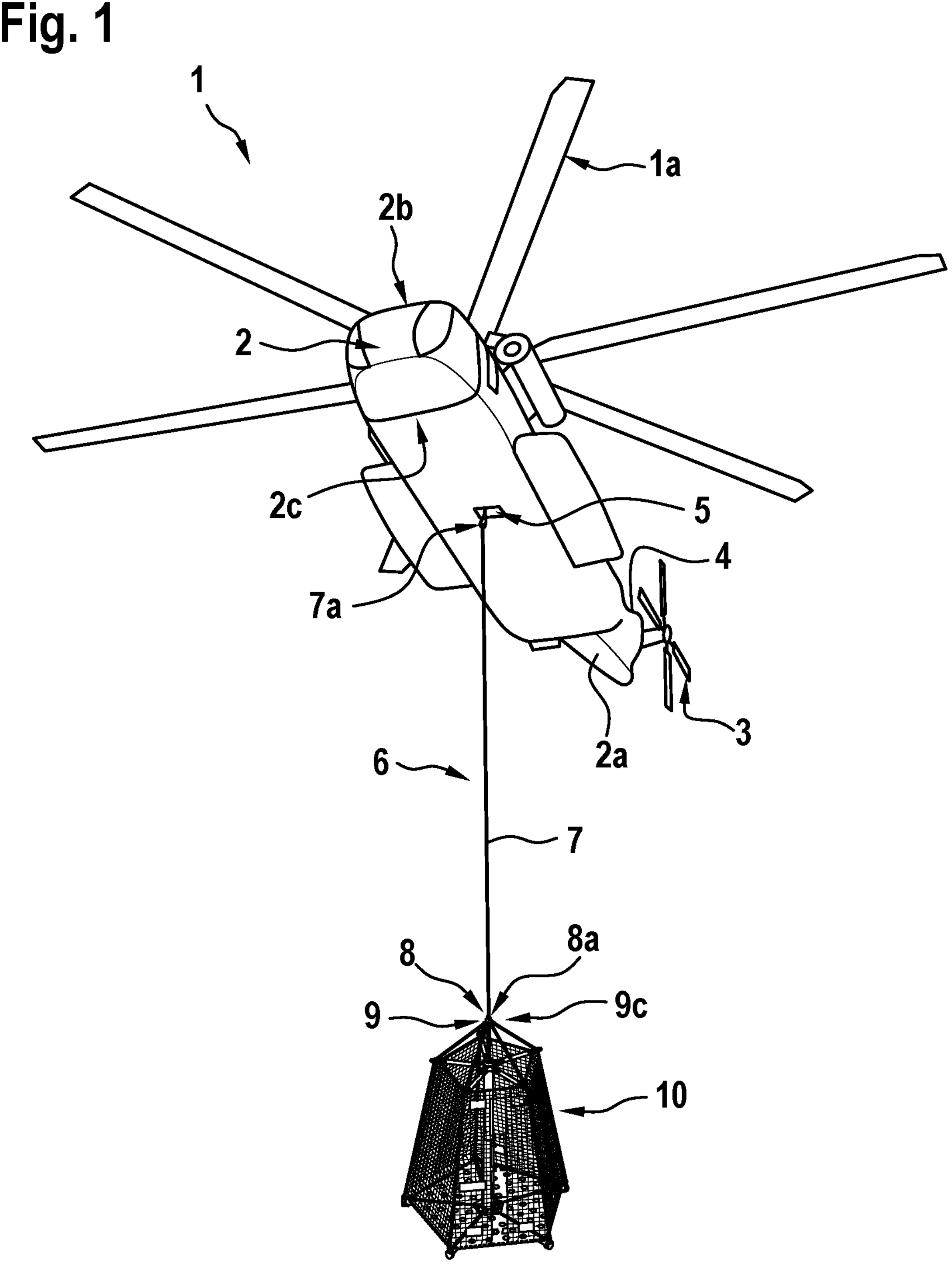
FIG. 1 shows a perspective view of a rotorcraft with a collapsible self-supporting human and/or non-human cargo transport device according to the present disclosure, in expanded state.

FIG. 1 shows a rotorcraft 1 that illustratively comprises a fuselage 2 with a bottom shell 2*c*. By way of example, the fuselage 2 forms a cabin 2*b* for passengers and/or cargo and a tail boom 2*a* is mounted to the fuselage 2. The rotorcraft 1 illustratively further comprises at least one main rotor 1*a* configured to provide lift and forward or backward thrust during operation, and at least one counter-torque device 3 configured to provide counter-torque during operation, i.e. to counter the torque created by rotation of the at least one main rotor 1*a* for purposes of balancing the rotorcraft 1 in terms of yaw.

The at least one counter-torque device 3 is illustratively provided at an aft section of the tail boom 2*a*, which preferably further comprises a fin 4. However, it should be noted that the at least one counter-torque device 3, as well as the fin 4 provided at the aft section of the tail boom 2*a*, are merely described for illustrating one possible realization of the rotorcraft 1.

According to one aspect, the rotorcraft 1 is provided with human and/or non-human cargo insertion/extraction means 6. By way of example, the human and/or non-human cargo insertion/extraction means 6 are attached to an associated rope attachment 5 provided at the bottom shell 2*c*. The rope attachment 5 is illustratively embodied as an attachment ring which may e.g. be connected to a cable that is coupled to a winch.

More specifically, the human and/or non-human cargo insertion/extraction means 6 preferably comprises a rope 7 with a rope interface 7*a*, such as an eyelet, which is illustratively attached to the rope attachment 5, e.g. by means of a snap hook respectively carabiner. The rope 7 is preferably provided with an attachment interface 8, such as a safety hook or snap hook 8*a* respectively carabiner. The attachment interface 8 is preferably provided to enable a secure and reliable attachment of external components to the rope 7. In a variant, the rope 7 is replaced by a cable.

By way of example, a device attachment 9 of a collapsible self-supporting human and/or non-human cargo transport device 10 is attached to the attachment interface 8. Illustratively, the device attachment 9 is mounted to the collapsible self-supporting human and/or non-human cargo transport device 10 at an associated mounting interface 9*c* provided at a carrier device (9*d* in FIG. 2) of the collapsible self-supporting human and/or non-human cargo transport device 10. The device attachment 9 may comprise load hooks (9*a*, 9*b* in FIG. 2). The collapsible self-supporting human and/or non-human cargo transport device 10 and/or its constituent components are further described below with reference to FIG. 2 to FIG. 9.

Illustratively, the rotorcraft 1 with the human and/or non-human cargo insertion/extraction means 6 is shown in operation. In this illustrative operation, the human and/or non-human cargo insertion/extraction means 6 for may e.g. be used inserting/extracting persons, i.e. human cargo, and/or goods and loads, i.e. non-human cargo, into/from a respective environment.

By way of example, the rotorcraft 1 is embodied as a helicopter. However, use of the human and/or non-human cargo insertion/extraction means 6 is not limited to use with a helicopter. Instead, the human and/or non-human cargo insertion/extraction means 6 may at least be used with other rotorcrafts, such as e.g. tiltrotor aircrafts, compound helicopters, multicopters and so on.

Figure 2:
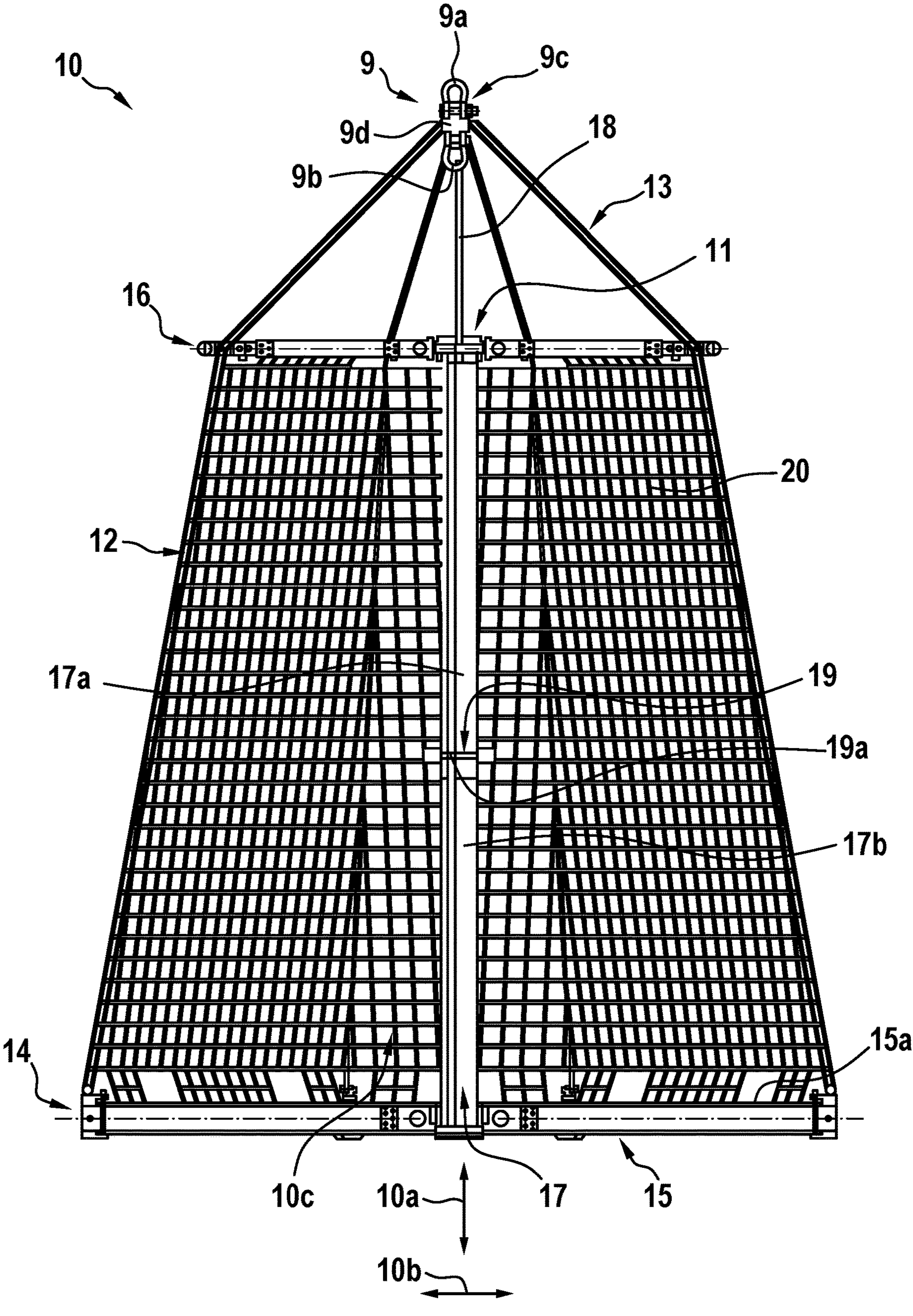
FIG. 2 shows a front view of the collapsible self-supporting human and/or non-human cargo transport device of FIG. 1, with a security transport net, a self-supporting skeletal frame, and a carrier platform structure.

FIG. 2 shows the collapsible self-supporting human and/or non-human cargo transport device 10 having the device attachment 9 with the mounting interface 9*c* of FIG. 1. For simplicity and brevity, the collapsible self-supporting human and/or non-human cargo transport device 10 is hereinafter merely referred to as the “cargo transport device 10”. The cargo transport device 10 preferably comprises an inner cargo storage area 10*c* for accommodating human and/or non-human cargo for transportation.

The mounting interface 9*c* is illustratively embodied at a first—in FIG. 2 upper—end of the carrier device 9*d* and provided with a load hook 9*a* for attachment to a rotorcraft rope or cable via a suitable attachment interface, e.g. the attachment interface 8 provided at the rotorcraft rope 7 of FIG. 1. By way of example, the device attachment 9 includes the load hook 9*a* that is rigidly mounted to the carrier device 9*d* for attachment to the suitable attachment interface, e.g. the attachment interface 8 provided at the rope 7 of FIG. 1.

Illustratively, the device attachment 9 further includes a load hook 9*b* that is rigidly mounted to a second end of the carrier device 9*d*, e.g. on a side of the carrier device 9*d* that is opposed to the first end, for attachment to an activation rope 18 of the cargo transport device 10. The activation rope 18 is connected to a self-supporting skeletal frame 11 of the cargo transport device 10 and, thus, attaches the self-supporting skeletal frame 11 to the rotorcraft 1 of FIG. 1 via the device attachment 9.

In addition to the self-supporting skeletal frame 11, the cargo transport device 10 preferably comprises a collapsible cargo securing means 12 mounted to the self-supporting skeletal frame 11 for delimiting the inner cargo storage area 10*c*. By way of example, the collapsible cargo securing means 12 comprises a security transport net 20. Accordingly, the inner cargo storage area 10*c* may be formed within boundaries set by the self-supporting skeletal frame 11 and the security transport net 20.

Illustratively, the self-supporting skeletal frame 11 comprises a telescopic rod 17 that is attached to the activation rope 18. The self-supporting skeletal frame 11 preferably further comprises a collapsible platform support structure 15 and a collapsible spreading structure 16 which are interconnected via the telescopic rod 17. By way of example, the collapsible spreading structure 16 is arranged—in FIG. 2—in an upper region of the self-supporting skeletal frame 11 to delimit an upper end of the inner cargo storage area 10*c*, whereas the collapsible platform support structure 15 is arranged—in FIG. 2—in a lower region of the self-supporting skeletal frame 11 to delimit a lower end of the inner cargo storage area 10*c*.

Preferably, the telescopic rod 17 extends in expanded state between the collapsible platform support structure 15 and the collapsible spreading structure 16 to interconnect both. More specifically, the telescopic rod 17 preferably forms, at least approximately, a center axis of the self-supporting skeletal frame 11 to ensure stability thereof.

Illustratively, the telescopic rod 17 comprises at least a first telescopic rod section 17*a* and a second telescopic rod section 17*b*. The first telescopic rod section 17*a* and the second telescopic rod section 17*b* preferably form—in FIG. 2—upper and lower sections of the telescopic rod 17, respectively. Accordingly, the first telescopic rod section 17*a* is also referred to as "the upper rod section 17*a*" hereinafter, and the second telescopic rod section 17*b* is also referred to as "the lower rod section 17*b*" hereinafter, for simplicity and clarity.

Preferably, an upper end (17*c* in FIGS. 7A and 7B) of the upper rod section 17*a* is attached to the activation rope 18. Furthermore, the upper rod section 17*a* is illustratively mounted to the collapsible spreading structure 16 and the lower rod section 17*b* is mounted to the collapsible platform support structure 15.

The upper rod section 17*a* preferably comprises a smaller diameter than the lower rod section 17*b* to be at least partially accommodated in the lower rod section 17*b* in the collapsed state. More specifically, the upper rod section 17*a* and the lower rod section 17*b* are preferably movable relative to each other in an unblocked state. In other words, when the telescopic rod 17 is expanded from a collapsed state to an expanded state or collapsed from the expanded state to the collapsed state, the upper rod section 17*a* and the lower rod section 17*b* may move relative to each other in a vertical or height direction 10*a*, and also expand/collapse in a horizontal or radial direction 10*b*.

Illustratively, the cargo transport device 10 further comprises blocking and securing means 19 configured for blocking the telescopic rod 17 at least in the expanded state. Preferably, the blocking and securing means 19 comprises a lock pin 19*a*. By way of example, the lock pin 19*a* may be engaging with both the upper rod section 17*a* and the lower rod section 17*b* to block any movement in the height direction 10*a* therebetween when the telescopic rod 17 is in the expanded state in which the telescopic rod 17 is e.g. at least approximately set to an average human body height. For instance, the upper rod section 17*a* and the lower rod section 17*b* may have aligned openings to accommodate the lock pin 19*a*. Thus, by way of example, the lock pin 19*a* may be inserted through the openings to prevent the upper rod section 17*a* from being moved relative to and, in particular, from being retracted from the lower rod section 17*b* during use of the cargo transport device 10, thus, ensuring stability and reliability of the self-supporting skeletal frame 11.

Preferably, the self-supporting skeletal frame 11 further comprises a plurality of tensioning cables 13 connecting the device attachment 9 to the collapsible spreading structure 16 and the collapsible platform support structure 15. Illustratively, the tensioning cables 13 may form an outer frame of the inner cargo storage area 10*c* in the horizontal or radial direction 10*b*. Preferably, the plurality of tensioning cables 13 may also form a load-bearing mechanism of the cargo transport device 10, as each one of the tensioning cables 13 connects the collapsible spreading structure 16 and the collapsible platform support structure 15 to the device attachment 9 and acts as an individual means to carry the load from the self-supporting skeletal frame 11.

Illustratively, the collapsible platform support structure 15 comprises a carrier platform structure 14 that supports a carrier platform 15*a* mounted thereto. The carrier platform 15*a* is preferably in form of a continuous textile floor, such as a cloth or a canvas. The carrier platform 15*a* may be provided with evenly distributed holes to reduce weight and may be locally reinforced, if required.

More particularly, the collapsible platform support structure 15 preferably comprise a plurality of pivotable carrying arms (15*b*, 15*c*, 15*d*, 15*e*, 15*f* in FIG. 4) to fold or unfold the carrier platform 15*a* in the horizontal or radial direction 10*b*. Similarly, the collapsible spreading structure 16 preferably comprises a plurality of pivotable support arms (16*b*, 16*c*, 16*d*, 16*e*, 16*f* in FIG. 4) to fold or unfold the collapsible spreading structure 16 in the horizontal or lateral direction 10*b*, so that the cargo transport device 10 is expandable/collapsible in the horizontal or radial direction 10*b*, as described above.

Figure 3:
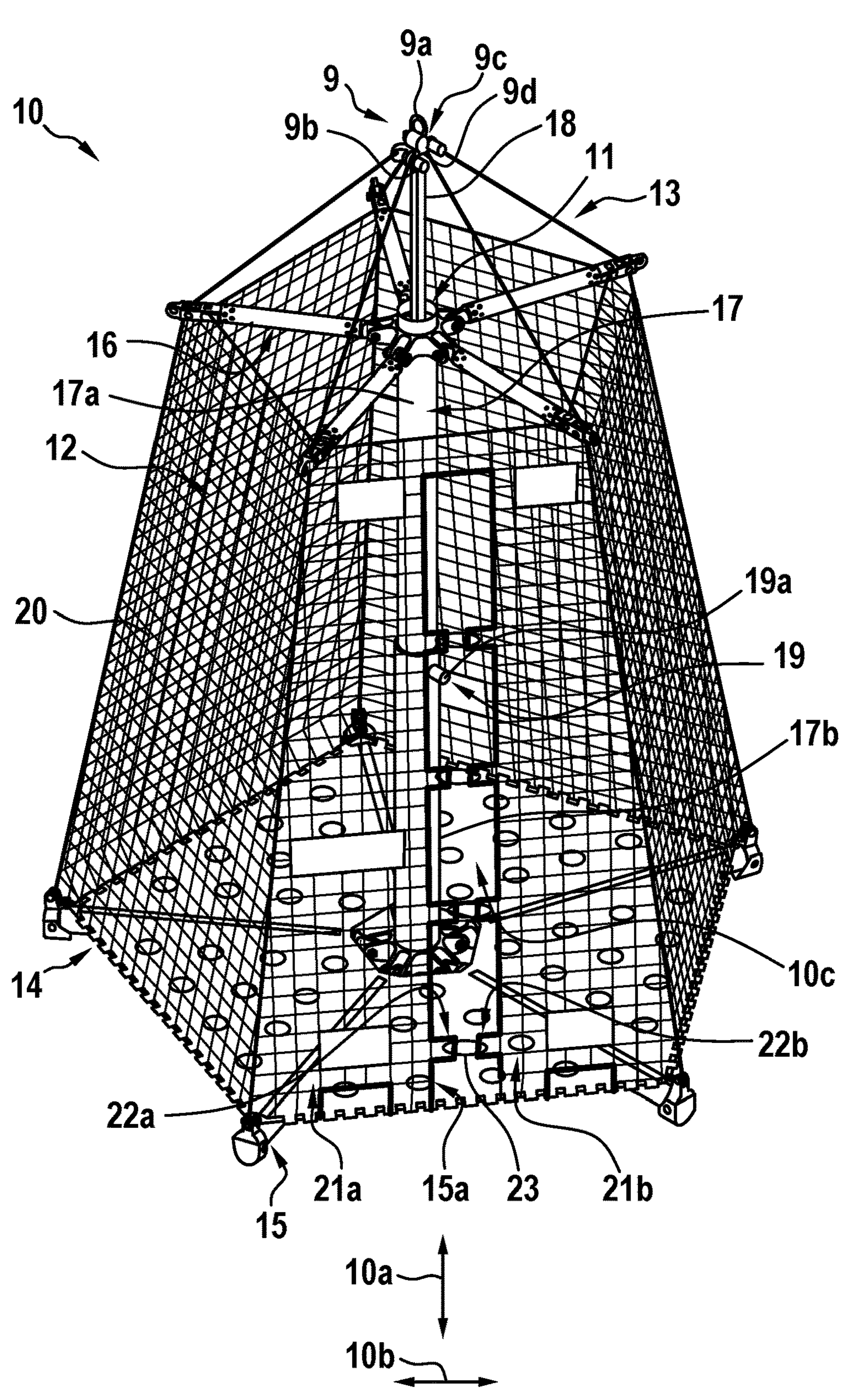
FIG. 3 shows a perspective view of the collapsible self-supporting human and/or non-human cargo transport device of FIG. 2.

FIG. 3 shows the cargo transport device 10 of FIG. 2 that is collapsible in both the height direction 10*a* and the horizontal direction 10*b*. The cargo transport device 10 comprises the self-supporting skeletal frame 11 equipped with the device attachment 9 and the activation rope 18. The self-supporting skeletal frame 11 comprises the carrier platform structure 14 with the carrier platform 15*a* that is mounted to the collapsible platform support structure 15, the collapsible spreading structure 16, the telescopic rod 17 with the blocking and securing means 19 comprising the lock pin 19*a* engaging the upper and lower rod sections 17*a*, 17*b*, as well as the tensioning cables 13. The self-supporting skeletal frame 11 is equipped with the security transport net 20 as part of the collapsible cargo securing means 12 for delimiting the inner cargo storage area 10*c*.

The collapsible cargo securing means 12 in the expanded state of the cargo transport device 10 extend upwardly between the collapsible spreading structure 16 and the collapsible platform support structure 15, and transversally to the center axis of the self-supporting skeletal frame 11, within the frame tensioning cables 13*b*, 13*c*, 13*d*, 13*e*, 13*f*.

As per Figures, the collapsible cargo securing means 12 in the expanded state of the cargo transport device 10 delimits the inner cargo storage area 10*c* for accommodating human and/or non-human cargo for transportation, between and inside tension cables 26 interconnect end sections of the collapsible spreading structure 16, frame tensioning cables 13*b*, 13*c*, 13*d*, 13*e*, 13*f* and the collapsible platform support structure 15 of the self-supporting skeletal frame 11.

According to one aspect, the security transport net 20 is embodied as a net-type structure that comprises e.g. five interconnected side-surfaces. Alternatively, three, four, six, or more side-surfaces may form the security transport net 20, if desired.

Illustratively, the security transport net 20 comprises cargo transport device entry nets 21*a*, 21*b* to form an entrance adapted to enable access to the inner cargo storage area 10*c*. By way of example, the security transport net 20 comprises e.g. two cargo transport device entry nets 21*a*, 21*b* arranged side by side. The two cargo transport device entry nets 21*a*, 21*b* may form one side-surface of the cargo transport device 10 to form a closable entrance. Illustratively, the closable entrance between cargo transport device entry nets 21*a*, 21*b* may be closed by at least one pair of, preferable multiple pairs of, reinforced closing loops.

By way of example, two reinforced closing loops 22*a*, 22*b* are located in a lower region of the security transport net 20 at respective edges of the two cargo transport device entry nets 21*a*, 21*b* at an at least essentially identical level in the vertical or height direction 10*a*. Similarly, other reinforced closing loops 22*a* may be arranged on the cargo transport device entry net 21*a*, preferably at different heights in the vertical or height direction 10*a*, and other corresponding reinforced closing loops 22*b* may be arranged on the cargo transport device entry net 21*b* in the same manner. One securing hook 23 is preferably used to attach the reinforced closing loops 22*a*, 22*b* to each other for forming a continuous link between them.

In other words, the closable entrance between the two cargo transport device entry nets 21*a*, 21*b* may preferably be closed by attaching the reinforced closing loops 22*a* of the cargo transport device entry net 21*a* to the corresponding reinforced closing loops 22*b* on cargo transport device entry net 21*b* using the securing hooks 23 after respective loading procedures onto the carrier platform 15 to achieve a safe transportation afterwards.

Illustratively, the carrier platform 15*a* is embodied as a textile floor with pentagonal shape. However, the shape of the carrier platform 15*a* may alternatively be triangular, square, hexagonal, or otherwise polygonal to match the security transport net 20. Thus, by way of example, the illustrative five edges of the carrier platform 15*a* may connect respective bottom sides of the security transport net 20 to enclose the bottom space of the inner cargo storage area 10*c* in terms of preventing human and/or the non-human cargo to fall off carrier platform 15*a*. Alternatively, or in addition, multiple small local openings may be provided at a bottom section of the security transport net 20 close to the carrier platform 15*a* in order to enable e.g. human cargo to step on the carrier platform 15*a* from the outside of the security transport net 20. Thus, by way of example, human cargo may be carried outside of the inner cargo storage area 10*c* with the cargo transport device 10. In this case, the frame tensioning cables 13 and/or additional attachment points for safety equipment may, by way of example, be utilized to provide grip to the human cargo transported on the outside of the security transport net 20.

Figure 4:
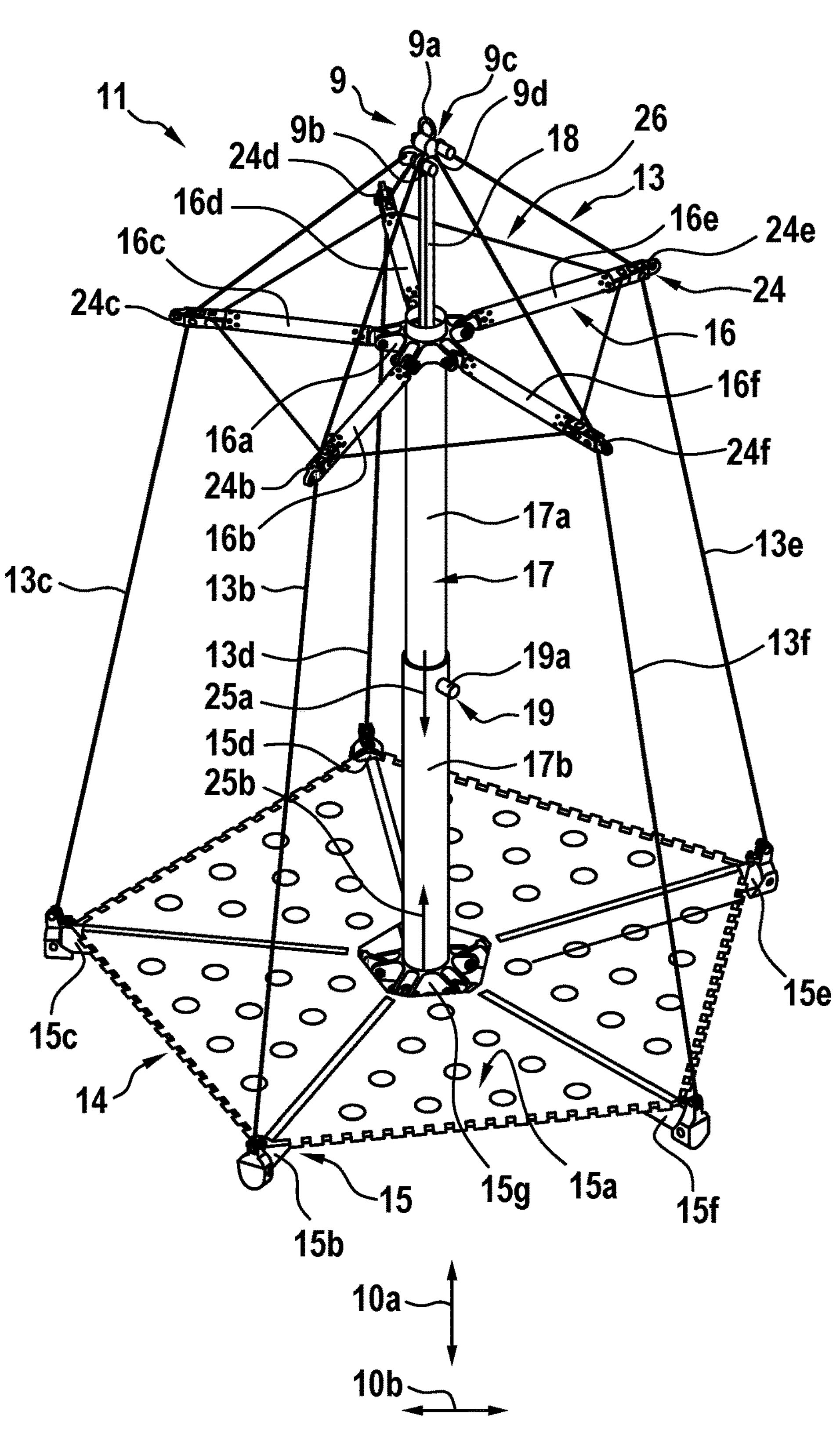
FIG. 4 shows a perspective view of the collapsible self-supporting human and/or non-human cargo transport device of FIG. 2 and FIG. 3, without the security transport net to further illustrate the self-supporting skeletal frame.

FIG. 4 shows the cargo transport device 10 of FIG. 2 and FIG. 3 that is collapsible in both the vertical direction 10*a* and the horizontal direction 10*b* and that comprises the self-supporting skeletal frame 11 equipped with the device attachment 9 and the activation rope 18. The self-supporting skeletal frame 11 comprises the carrier platform structure 14 having the carrier platform 15*a* mounted to the collapsible platform support structure 15, the collapsible spreading structure 16, the telescopic rod 17 with the blocking and securing means 19 comprising the lock pin 19*a* engaging the upper and lower rod sections 17*a*, 17*b*, as well as the tensioning cables 13. However, the security transport net 20 of FIG. 2 and FIG. 3 is omitted to further illustrate the self-supporting skeletal frame 11 with the collapsible platform support structure 15, the collapsible spreading structure 16, and the tensioning cables 13.

Illustratively, the collapsible spreading structure 16 comprises a—in FIG. 4 upper—support ring 16*a* rigidly mounted on the telescopic rod 17, preferably on the upper rod section 17*a*, as well as a plurality of pivotable support arms 16*b*, 16*c*, 16*d*, 16*e*, 16*f*. The plurality of pivotable support arms 16*b*, 16*c*, 16*d*, 16*e*, 16*f* of the collapsible spreading structure 16 is preferably pivotally mounted to the support ring 16*a*.

More specifically, tension cables 26 are preferably used to interconnect respective end sections of the pivotable support arms 16*b*, 16*c*, 16*d*, 16*e*, 16*f* of the collapsible spreading structure 16. Thus, by way of example, the flexibility between the pivotable support arms 16*b*, 16*c*, 16*d*, 16*e*, 16*f* is restricted by the tension cables 26 and the stability of the collapsible spreading structure 16 is improved. Fold or unfolding of the collapsible spreading structure 16 may be achieved by pulling/pushing one of the pivotable support arms 16*b*, 16*c*, 16*d*, 16*e*, 16*f* in the vertical direction 10*a*, as the remaining pivotable support arms would follow the pulling/pushing movement.

By way of example and for purposes of illustration, the frame tensioning cables 13 comprise five individual frame tensioning cables 13*b*, 13*c*, 13*d*, 13*e*, 13*f*. Preferably, the collapsible spreading structure 16 comprises likewise five pivotable support arms 16*b*, 16*c*, 16*d*, 16*e*, 16*f* to interconnect with the five individual frame tensioning cables 13*b*, 13*c*, 13*d*, 13*e*, 13*f*, respectively. Illustratively, the collapsible spreading structure 16 preferably further comprises cable guides 24 comprising individual cable guides 24*b*, 24*c*, 24*d*, 24*e*, 24*f* to accommodate the tensioning cables 13.

Illustratively, the tension cables 26 and individual frame tensioning cables 13*b*, 13*c*, 13*d*, 13*e*, 13*f* are depicted as means to mount the security transport net 20 of FIG. 2 and FIG. 3 to the self-supporting skeletal frame 11. More specifically, the tension cables 26 and the carrier platform 15*a* of the collapsible platform support structure 15 may be secured to the top resp. bottom of the security transport net 20, respectively.

Preferably, the collapsible platform support structure 15 comprises a—in FIG. 4 lower—carrying ring 15*g* slidably mounted on the telescopic rod 17, preferably on the lower rod section 17*b*, as well as a plurality of pivotable carrying arms 15*b*, 15*c*, 15*d*, 15*e*, 15*f*. Furthermore, the lower rod section 17*b* is preferably provided with an end stop (32 in FIG. 7A) forming a mechanical end stop for a sliding movement of the carrying ring 15*g*.

Illustratively, the plurality of pivotable carrying arms 15*b*, 15*c*, 15*d*, 15*e*, 15*f* of the collapsible platform support structure 15 is pivotally mounted to the carrying ring 15*g*. By way of example, the collapsible platform t structure 15 comprises five pivotable carrying arms 15*b*, 15*c*, 15*d*, 15*e*, 15*f* to be connected with the five individual frame tensioning cables 13*b*, 13*c*, 13*d*, 13*e*, 13*f*, respectively. Preferably, additional attachments may be provided at each one of the plurality of pivotable carrying arms 15*b*, 15*c*, 15*d*, 15*e*, 15*f*, e.g. for being connected with the individual frame tensioning cables 13*b*, 13*c*, 13*d*, 13*e*, 13*f* and for being clamped to the carrier platform 15*a*.

For simplicity and clarity of the description, the individual frame tensioning cable 13*b*, the pivotable carrying arm 15*b*, an individual cable attachment (31*b* in FIG. 6), the pivotable support arm 16*b*, the individual cable guide 24*b* and its components, an individual guiding lug 27*b*, and an individual outer cargo lug (35*b* in FIG. 5) are described in more detail hereinafter representative for the plurality of frame tensioning cables 13, the plurality of pivotable carrying arms 15*b*, 15*c*, 15*d*, 15*e*, 15*f*, a plurality of cable attachments (31 in FIG. 6), the plurality of pivotable support arms 16*b*, 16*c*, 16*d*, 16*e*, 16*f*, the plurality of cable guides 24 and their components, a plurality of guiding lugs (27 in FIG. 5), and a plurality of outer cargo lugs (35 in FIG. 5).

More specifically, the pivotable support arm 16*b* may, by way of example, comprise one corresponding individual cable guide 24*b* to have one corresponding individual frame tensioning cable 13*b* passing therethrough. Preferably, a first—in FIG. 4 upper—end of the individual frame tensioning cable 13*b* may connect to the carrier device 9*d* of the device attachment 9, whereas a second—in FIG. 4 lower—end of the individual frame tensioning cable 13*b* may connect to the pivotable carrying arm 15*b* at an individual cable attachment (31*b* in FIG. 6). Preferably, the individual frame tensioning cable 13*b* may pass through the individual cable guide 24*b* to connect the pivotable support arm 16*b* to the pivotable carrying arm 15*b*. Thus, by way of example, each one of the pivotable support arms 16*b*, 16*c*, 16*d*, 16*e*, 16*f* is connected to one of the corresponding five pivotable carrying arms 15*b*, 15*c*, 15*d*, 15*e*, 15*f* via one of the corresponding individual frame tensioning cables 13*b*, 13*c*, 13*d*, 13*e*, 13*f*.

In an illustrative operation, by pushing the pivotable carrying arm 15*b* to fold or unfold around the lower rod section 17*b*, the movement of the attached individual frame tensioning cable 13*b* engages with the pivotable support arm 16*b* and, thus, encourages the engaged pivotable support arm 16*b* to fold or unfold simultaneously, and vice versa.

Illustratively, the support ring 16*a* of the collapsible spreading structure 16 is, by way of example, rigidly mounted to the upper rod section 17*a*. Illustratively, the carrying ring 15*g* of the collapsible platform support structure 15 is slidably mounted to the lower rod section 17*b*. Thus, by way of example, the support ring 16*a* may move in the vertical or height direction 10*a* with the upper rod section 17*a* while the carrying ring 15*g* may move in the vertical or height direction 10*a* with respect to the lower rod section 17*b*.

More specifically, the support ring 16*a* may be attached to the upper end (17*c* in FIGS. 7A and 7B) of the upper rod section 17*a* and, during expanding of the cargo transport device 10, the carrying ring 15*g* may slide to and abut against a mechanical end stop at a lower end (17*d* in FIGS. 7A and 7B) of the lower rod section 17*b*. Thus, by way of example, the distance between the support ring 16*a* and the carrying ring 15*g* may be as far as the full expanded height of the telescopic rod 17. Preferably, the carrying ring 15*g* slides toward the support ring 16*a* during collapsing of the cargo transport device 10 to be close to the support ring 16*a* of the collapsible spreading structure 16.

Preferably, the collapsible spreading structure 16 may be collapsed by means of a movement of the support ring 16*a* in a first collapsing direction 25*a* toward the carrying ring 15*g* of the collapsible platform support structure 15 such that the upper rod section 17*a* glides into the lower rod section 17*b*. The collapsible platform support structure 15, in turn, may be collapsed by means of a movement of the carrying ring 15*g* in a second collapsing direction 25*b* toward the support ring 16*a* of the collapsible spreading structure 16.

More specifically, by moving the support ring 16*a* and the carrying ring 15*g* close to each other along the first and second collapsing directions 25*a*, 25*b* as described above, the frame tensioning cables 13 connecting them become less tense and, thus, the pivotable support arms 16*b*, 16*c*, 16*d*, 16*e*, 16*f* are gradually folded downward in the vertical direction 10*a* and inward in the horizontal direction 10*b*. Similarly, the pivotable carrying arms 15*b*, 15*c*, 15*d*, 15*e*, 15*f* are also gradually folded downward in the vertical direction 10*a* and inward in the horizontal direction 10*b*. Meanwhile, the upper rod section 17*a* slides into the lower rod section 17*b*. Thus, by way of example, collapsing of the cargo transport device 10 in both the vertical direction 10*a* and the horizontal direction 10*b* may be achieved.

Figure 5:
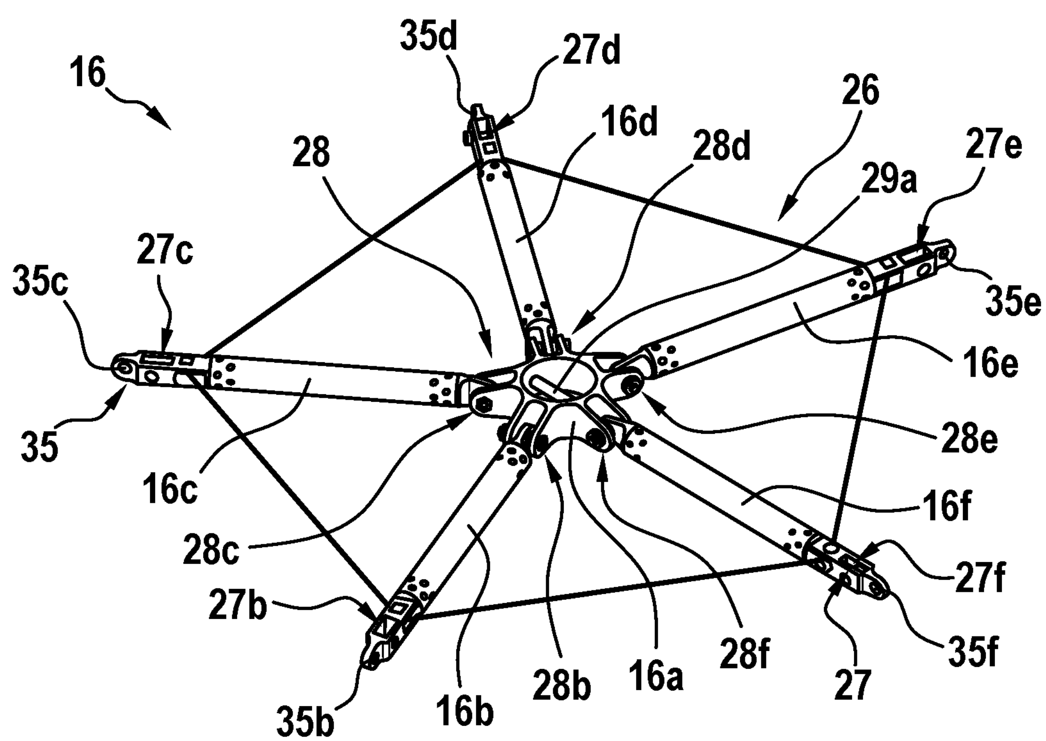
FIG. 5 shows a perspective view of a collapsible spreading structure of the self-supporting skeletal frame of FIG. 4.

FIG. 5 shows the collapsible spreading structure 16 of FIG. 4, wherein the pivotable support arms 16*b*, 16*c*, 16*d*, 16*e*, 16*f* are attached to the support ring 16*a* and the tension cables 26. FIG. 5 further shows an illustrative realization of the cable guides 24 of FIG. 4 in more detail.

More specifically, the collapsible spreading structure 16 preferably comprises a plurality of hinges 28 to pivotally connect the pivotable support arms 16*b*, 16*c*, 16*d*, 16*e*, 16*f* to the support ring 16*a*. Illustratively, five individual hinges 28*b*, 28*c*, 28*d*, 28*e*, 28*f* are provided along the external circumference of the support ring 16*a*.

By way of example, the individual hinge 28*b* with the pivotable support arm 16*b* is described in more detail hereinafter representative for the plurality of hinges 28 with the plurality of pivotable support arms 16*b*, 16*c*, 16*d*, 16*e*, 16*f*, for simplicity and conciseness of the description.

More specifically, the individual hinge 28*b* may be rigidly connected to or integrally formed with the support ring 16*a*. Preferably, the individual hinge 28*b* is pivotally connected to a first—in FIG. 5 inner—end of the pivotable support arm 16*b*. Thus, by way of example, the pivotable support arm 16*b* may pivot around the support ring 16*a* to fold or unfold.

Furthermore, the cable guides 24 of FIG. 4 may preferably comprise guiding lugs 27 and outer cargo lugs 35 as described above at FIG. 5. Illustratively, the guiding lugs 27 and the outer cargo lugs 35 are formed as integral parts of the cable guides 24 of FIG. 4. The guiding lugs 27 comprise, by way of example, individual guiding lugs 27*b*, 27*c*, 27*d*, 27*e*, 27*f* to accommodate the individual frame tensioning cables 13*b*, 13*c*, 13*d*, 13*e*, 13*f* of FIG. 4. Illustratively, the outer cargo lugs 35 comprise individual outer cargo lugs 35*b*, 35*c*, 35*d*, 35*e*, 35*f* as the additional attachment points for safety equipment outside the security transport net 20 of FIG. 3.

For simplicity and clarity of the description, and as a representative illustration, the pivotable support arm 16*b* is provided with the individual guiding lug 27*b* and the individual outer cargo lug 35*b*, wherein, by way of example, the individual outer cargo lug 35*b* may be located at a second—in FIG. 5 outer—end of the corresponding pivotable support arm 16*b*. An opening may be provided at the pivotable support arm 16*b* to accommodate the tension cables 26 that interconnect the five support arms 16*b*, 16*c*, 16*d*, 16*e*, 16*f*. Illustratively, the individual guiding lug 27*b* may be located between the opening accommodating the tension cables 26 and the corresponding one individual outer cargo lug 35*b*.

Illustratively, a mounting rod 29*a* may rigidly connect the support ring 16*a* to the upper rod section 17*a* of the telescopic rod 17 of FIG. 4. The connecting mechanisms engaging the mounting rod 29*a* are further described below with reference to FIGS. 7A and 7B.

Figure 6:
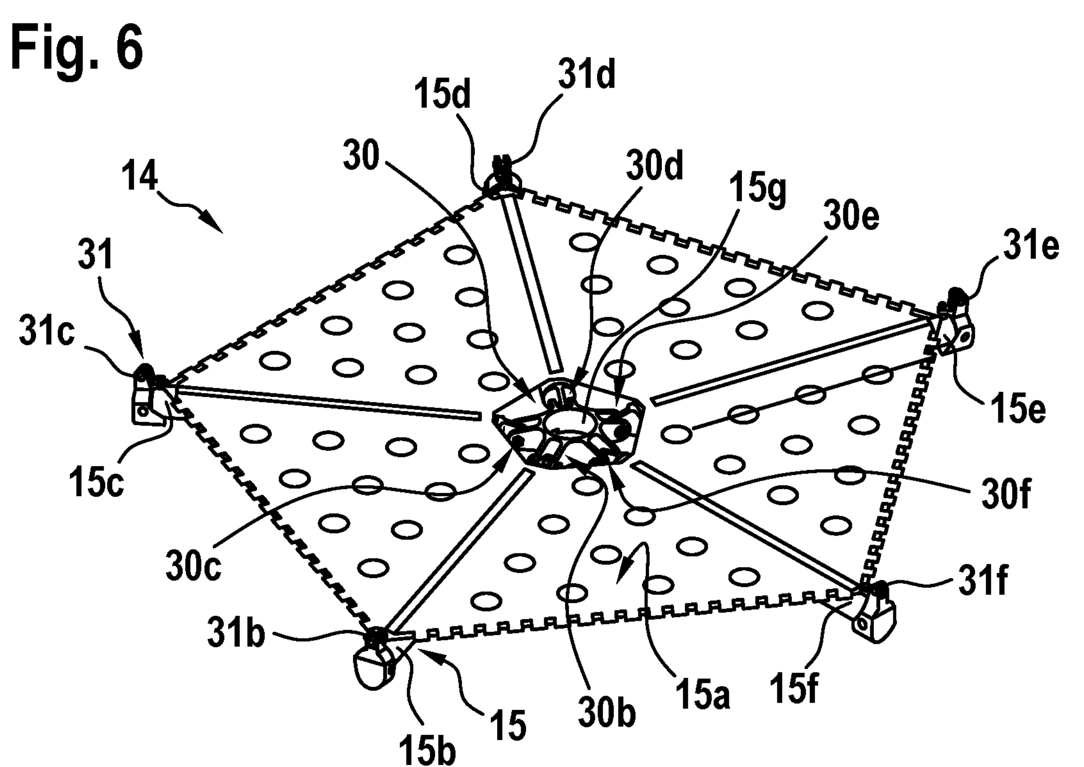
FIG. 6 shows a perspective view of the carrier platform structure of the self-supporting skeletal frame of FIG. 4.

FIG. 6 shows the collapsible platform support structure 15 of the carrier platform structure 14 of FIG. 4 with the carrier platform 15*a* mounted thereto, wherein the pivotable carrying arms 15*b*, 15*c*, 15*d*, 15*e*, 15*f* mounted to the carrying ring 15*g* are shown in more detail.

More specifically, the collapsible platform support structure 15 preferably comprises a plurality of hinges 30 to pivotally connect the pivotable carrying arms 15*b*, 15*c*, 15*d*, 15*e*, 15*f*. Illustratively, five individual hinges 30*b*, 30*c*, 30*d*, 30*e*, 30*f* are provided along the external circumference of the carrying ring 15*g* in FIG. 6.

The individual hinge 30*b* with the pivotable carrying arm 15*b* is described in more detail hereinafter representative for the plurality of hinges 30 with the plurality of pivotable carrying arms 15*b*, 15*c*, 15*d*, 15*e*, 15*f*, for simplicity and conciseness of the description.

More specifically, the individual hinge 30*b* may be rigidly connected to, or integrally formed with, the carrying ring 15*g*. Illustratively, the individual hinge 30*b* is pivotally connected to a first—in FIG. 6 inner—end of the pivotable carrying arm 15*b*. Thus, by way of example, the pivotable carrying arm 15*b* may pivot to fold or unfold around the carrying ring 15*g*.

Preferably, the collapsible platform support structure 15 comprises a plurality of cable attachments 31 for rigid attachment of the frame tensioning cables 13 of FIG. 4. The plurality of cable attachments 31 preferably comprises individual cable attachments 31*b*, 31*c*, 31*d*, 31*e*, 31*f* for connecting the frame tensioning cables 13 to the pivotable carrying arms 15*b*, 15*c*, 15*d*, 15*e*, 15*f*. For simplicity and conciseness of the description, and as a representative illustration, the individual cable attachment 31*b* is illustratively provided at an outer end of the pivotable carrying arm 15*b* to connect the pivotable carrying arm 15*b* to the individual frame tensioning cable 13*b* of FIG. 4.

Figures 7A, 7B:
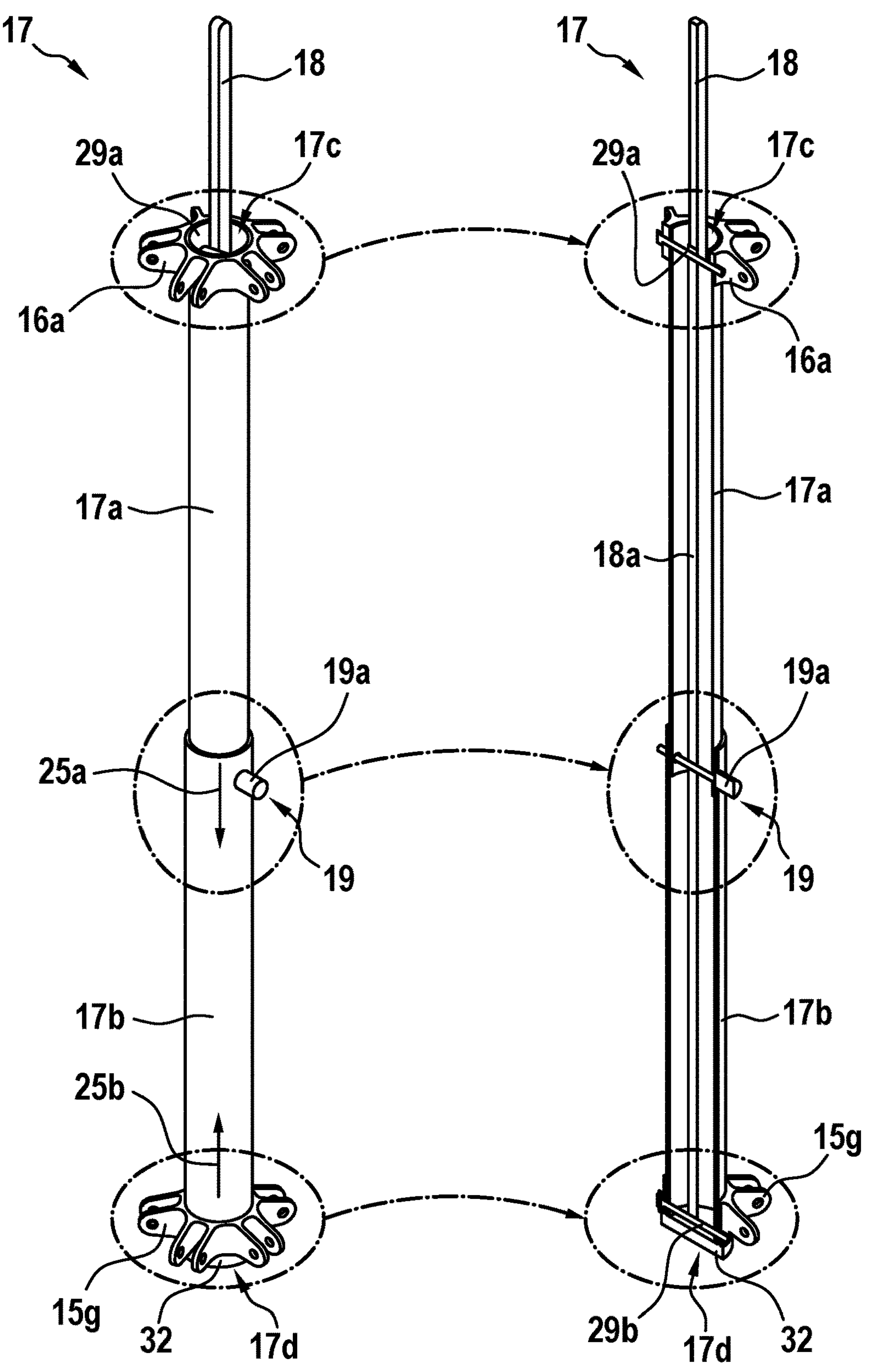
FIG. 7A shows a perspective view of a telescopic rod of the self-supporting skeletal frame of FIG. 4 in expanded state.
FIG. 7B shows a sectional view of the telescopic rod of FIG. 7A.

FIG. 7A and FIG. 7B show the telescopic rod 17 of the self-supporting skeletal frame 11 of FIG. 2 to FIG. 4 in the expanded state. The telescopic rod 17 is collapsible in the first collapsing direction 25*a* and the second collapsing direction 25*b* as described above. In the expanded state, the engaged lock pin 19*a* of the blocking and securing means 19 illustratively blocks collapsing of the telescopic rod 17. FIG. 7A and FIG. 7B further illustrate the upper rod section 17*a* having the support ring 16*a*, the activation rope 18, and a mounting rod 29*a* mounted thereon, as well as the lower rod section 17*b* having the carrying ring 15*g* mounted thereon and a mounting rod 29*b*.

Illustratively, the telescopic rod 17 of FIG. 7A is in the (fully) expanded state. In the expanded state, the support ring 16*a* and the carrying ring 15*g* are arranged on opposed axial ends of the telescopic rod 17, i.e. on an upper end 17*c* and a lower end 17*d* of the telescopic rod 17. More specifically, the support ring 16*a* is rigidly mounted on the upper rod section 17*a* at the upper end 17*c* by the mounting rod 29*a* traversing the support ring 16*a* and the upper rod section 17*a*, while the carrying ring 15*g* is slidably mounted on the lower rod section 17*b* and illustratively abuts against a suitable mechanical end stop 32.

More specifically, the lower rod section 17*b* is provided with the end stop 32 at the lower end 17*d* forming a mechanical end stop for a sliding movement of the carrying ring 15*g* in the expanded state. Preferably, the carrying ring 15*g* abuts against the end stop 32 in the expanded state of the telescopic rod 17 such that any further movement of the carrying ring 15*g* along the telescopic rod 17 in the first collapsing direction 25*a* is prevented. Referring to FIG. 7B, the end stop 32 is, by way of example, rigidly mounted to the second telescopic rod section 17*b* by the means of the mounting rod 29*b* traversing the end stop 32 and the lower rod section 17*b*.

Figure 9:
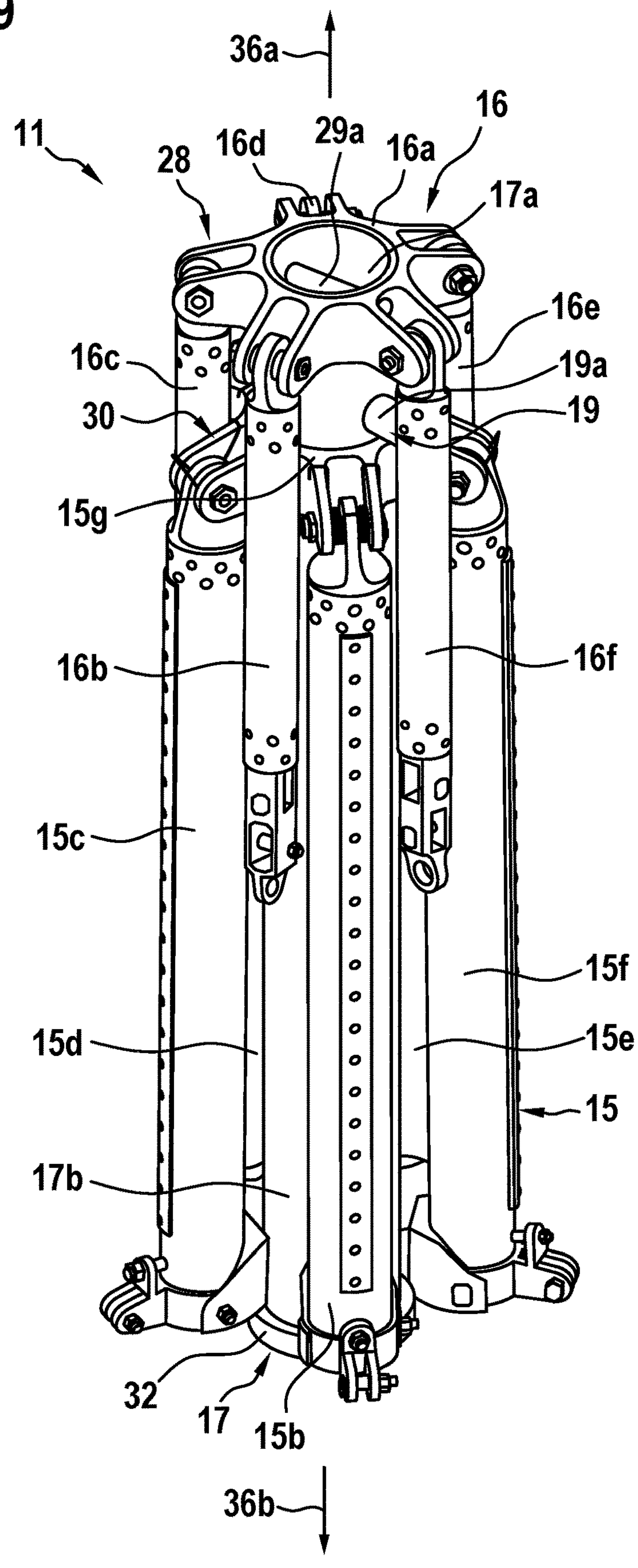
FIG. 9 shows a perspective view of the self-supporting skeletal frame of FIG. 4 without the carrier platform structure, in collapsed state.

In an illustrative realization, when the telescopic rod 17 begins to collapse from the expanded state of FIG. 7A and FIG. 7B, the upper rod section 17*a* carrying the support ring 16*a* at the upper end 17*c* moves in the first collapsing direction 25*a*, while the carrying ring 15*g* at the lower end 17*d* slides along the lower rod section 17*b* in the second collapsing direction 25*b*. Thus, by way of example, the support ring 16*a* and the carrying ring 15*g* are moved towards each other such that they are close to each other near the blocking and securing means 19 in the collapsed state of the telescopic rod 17, as shown in FIG. 9.

Preferably, a tension rope 18*a* is provided inside the telescopic rod 17, which is connected to the mounting rod 29*a* at the upper end 17*c* and the mounting rod 29*b* at the lower end 17*d*. More specifically, the length of the tension rope 18*a* is preferably set to permit itself to be in tension during the use of the cargo transport device 10 of FIG. 1 to FIG. 3 to bear loads so that the telescopic rod 17 only carries its own weight and maintains the stability of the cargo transport device 10. Thus, by way of example, the tension rope 18*a* and the activation rope 18 serve as load-bearing ropes for the cargo transport device 10 of FIG. 1 to FIG. 3.

Figure 8:
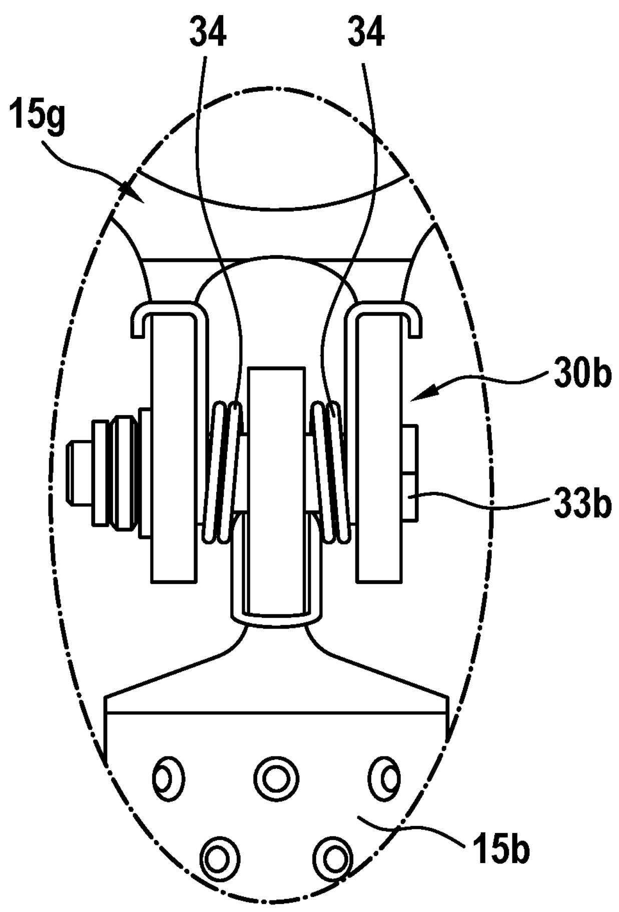
FIG. 8 shows a top view of a connecting mechanism of a pivotable carrying arm and a carrying ring of the carrier platform structure of FIG. 6.

FIG. 8 shows a connecting mechanism of the pivotable carrying arm 15*b* and the carrying ring 15*g* of the collapsible platform support structure 15 of the carrier platform structure 14 of FIG. 6 via the individual hinge 30*b* of FIG. 6. Illustratively, the connecting mechanism of the pivotable carrying arm 15*b* with the carrying ring 15*g* is shown in detail, representative of other connecting mechanisms of the pivotable carrying arms 15*b*, 15*c*, 15*d*, 15*e*, 15*f* to the carrying ring 15*g*.

More specifically, the individual hinge 30*b* preferably comprises a pin 33*b* that pivotally connects the pivotable carrying arm 15*b* to the carrying ring 15*g*. Illustratively, a double leg spring is mounted on the pin 33*b* to provide torsion to the pivotable carrying arm 15*b* to facilitate pivotal folding of the pivotable carrying arm 15*b* around the lower rod section 17*b* of FIG. 7A and FIG. 7B.

FIG. 9 shows the self-supporting skeletal frame 11 of FIG. 2 to FIG. 4 in the collapsed state, wherein the pivotable carrying arms 15*b*, 15*c*, 15*d*, 15*e*, 15*f* of the collapsible platform support structure 15 and the pivotable support arms 16*b*, 16*c*, 16*d*, 16*e*, 16*f* of the collapsible spreading structure 16 are respectively folded at the hinges 28, 30 and collapsed around the collapsed telescopic rod 17 comprising the upper rod section 17*a* and the lower rod section 17*b*.

Illustratively, the upper rod section 17*a* is at least partially accommodated in the lower rod section 17*b* in the collapsed state of the telescopic rod 17. Thus, by way of example, the support ring 16*a* and the carrying ring 15*g* are arranged close to each other in the collapsed state.

By way of example, a respective distance between the support ring 16*a* and the carrying ring 15*g* in the expanded state of the telescopic rod 17, as illustrated in FIG. 7A and FIG. 7B, is preferably at least shortened by more than 50% during collapsing of the telescopic rod 17 such that the support ring 16*a* and the carrying ring 15*g* are significantly approached to each other in the collapsed state as shown in FIG. 9. However, the distance between the support ring 16*a* and the carrying ring 15*g* in the expanded state may alternatively also be reduced by e.g. 30%, 60%, 80%, or more during the collapsing, if desired, to provide the cargo transport device 10 in the collapsed state with a desired height. Illustratively, in the collapsed state of the telescopic rod 17 of FIG. 9, the upper rod section 17*a* is almost entirely moved into the lower rod section 17*b* such that the support ring 16*a* abuts against the lower rod section 17*b*.

By way of example, the plurality of pivotable carrying arms 15*b*, 15*c*, 15*d*, 15*e*, 15*f* and the plurality of pivotable support arms 16*b*, 16*c*, 16*d*, 16*e*, 16*f* are substantially parallel to the axis of the telescopic rod 17 in the collapsed state. Preferably, in the collapsed state each of the plurality of pivotable carrying arms 15*b*, 15*c*, 15*d*, 15*e*, 15*f* is arranged in a gap formed between two adjacent collapsed pivotable support arms 16*b*, 16*c*, 16*d*, 16*e*, 16*f*.

Illustratively, the pivotable support arms 16*b*, 16*c*, 16*d*, 16*e*, 16*f* and the carrying ring 15*g* are movable in opposite directions, namely a first expansion direction 36*a* and a second expansion direction 36*b*, to permit expansion of the telescopic rod 17, i.e. the self-supporting skeletal frame 11, from the collapsed state to the expanded state. More specifically, when the collapsed telescopic rod 17 is released and only hold via the activation rope 18 of FIG. 2 to FIG. 4 and FIG. 7, the carrying ring 15*g* may move together with the lower rod section 17*b* downward in the expansion direction 36*b*, e.g. either by being pulled or simply by gravity, to initiate expansion of the telescopic rod 17. In response to such a movement of the carrying ring 15*g* and the lower rod section 17*b*, the pivotable carrying arms 15*b*, 15*c*, 15*d*, 15*e*, 15*f* and the pivotable support arms 16*b*, 16*c*, 16*d*, 16*e*, 16*f* perform a pivotal movement oriented upward in the expansion direction 36*a* on the carrying ring 15*g* resp. the support ring 16*a*.

REFERENCE LIST

1 rotorcraft
1*a* main rotor
2 fuselage
2*a* tail boom
2*b* cabin
2*c* bottom shell
3 counter-torque device
4 fin
5 rope attachment
6 human and/or non-human cargo insertion/extraction means
7 rope
7*a* rope interface
8 attachment interface
8*a* snap hook
9 device attachment
9*a*, 9*b* load hooks
9*c* mounting interface
9*d* carrier device
10 human and/or non-human cargo transport device
10*a* vertical or height direction
10*b* horizontal or radial direction
10*c* inner cargo storage area
11 self-supporting skeletal frame
12 collapsible cargo securing means
13 frame tensioning cables
13*b*, 13*c*, 13*d*, 13*e*, 13*f* individual frame tensioning cables
14 carrier platform structure
15 collapsible platform support structure
15*a* carrier platform
15*b*, 15*c*, 15*d*, 15*e*, 15*f* pivotable carrying arms
15*g* carrying ring
16 collapsible spreading structure
16*a* support ring
16*b*, 16*c*, 16*d*, 16*e*, 16*f* pivotable support arms
17 telescopic rod
17*a* upper telescopic rod section
17*b* lower telescopic rod section
17*c* upper end
17*d* lower end
18 activation rope
18*a* tension rope
19 blocking and securing means
19*a* lock pin
20 security transport net
21*a*, 21*b* cargo transport device entry nets
22*a*, 22*b* reinforced closing loops
23 securing hooks
24 cable guides
24*b*, 24*c*, 24*d*, 24*e*, 24*f* individual cable guides
25*a* first collapsing direction
25*b* second collapsing direction
26 tension cables
27 guiding lugs
27*b*, 27*c*, 27*d*, 27*e*, 27*f* individual guiding lugs
28 hinges
28*b*, 28*c*, 28*d*, 28*e*, 28*f* individual hinges
29*a*, 29*b* mounting rods
30 hinges
30*b*. 30*c*. 30*d*. 30*c*. 30*f* individual hinges
31 cable attachments
31*b*. 31*c*. 31*d*. 31*c*. 31*f* individual cable attachments
32 end stop
33*b* pin
34 double leg spring
35 outer cargo lugs
35*b*. 35*c*. 35*d*. 35*c*. 35*f* individual outer cargo lugs
36*a* first expansion direction
36*b* second expansion direction

What is claimed is:

1. A collapsible self-supporting human and/or non-human cargo transport device for use with a rotorcraft, comprising:
- an inner cargo storage area for accommodating human and/or non-human cargo for transportation;
- a self-supporting skeletal frame comprising:
  - a collapsible platform support structure,
  - a collapsible spreading structure,
  - a telescopic rod connecting the collapsible platform support structure to the collapsible spreading structure,
  - an attachment connected to the telescopic rod to enable attachment of the self-supporting skeletal frame to the rotorcraft, and
  - a plurality of tensioning cables each connecting the attachment to the collapsible spreading structure and to the collapsible platform support structure; and
- collapsible cargo securing means mounted to the self-supporting skeletal frame for delimiting the inner cargo storage area.

2. The collapsible self-supporting human and/or non-human cargo transport device of claim 1, wherein the telescopic rod comprises at least a first telescopic rod section and a second telescopic rod section; wherein the first telescopic rod section and the second telescopic rod section are movable relative to each other in an unblocked state; wherein the collapsible spreading structure is mounted to the first telescopic rod section; and wherein the collapsible platform support structure is mounted to the second telescopic rod section.

3. The collapsible self-supporting human and/or non-human cargo transport device of claim 1, wherein the collapsible platform support structure comprises a carrying ring slidably mounted on the telescopic rod.

4. The collapsible self-supporting human and/or non-human cargo transport device of claim 3, wherein the collapsible platform support structure comprises a plurality of pivotable carrying arms.

5. The collapsible self-supporting human and/or non-human cargo transport device of claim 4, wherein the plurality of pivotable carrying arms is pivotally mounted to the carrying ring.

6. The collapsible self-supporting human and/or non-human cargo transport device of claim 3, wherein the carrying ring is slidably mounted on the second telescopic rod section; and wherein the second telescopic rod section is provided with an end stop forming a mechanical end stop for a sliding movement of the carrying ring.

7. The collapsible self-supporting human and/or non-human cargo transport device of claim 1, wherein the collapsible spreading structure comprises a support ring rigidly mounted to the telescopic rod.

8. The collapsible self-supporting human and/or non-human cargo transport device of claim 7, wherein the collapsible spreading structure comprises a plurality of pivotable support arms.

9. The collapsible self-supporting human and/or non-human cargo transport device of claim 8, wherein the plurality of pivotable support arms is pivotally mounted to the support ring.

10. The collapsible self-supporting human and/or non-human cargo transport device of claim 7, wherein the support ring is rigidly mounted on the first telescopic rod section.

11. The collapsible self-supporting human and/or non-human cargo transport device of claim 10, wherein the support ring and the carrying ring are movable in opposite directions by means of the telescopic rod to permit expansion of the self-supporting skeletal frame.

12. The collapsible self-supporting human and/or non-human cargo transport device of claim 10, wherein the support ring and the carrying ring are arranged on opposed axial ends of the telescopic rod in expanded state of the telescopic rod; and wherein the support ring and the carrying ring are arranged close to each other in collapsed state of the telescopic rod.

13. The collapsible self-supporting human and/or non-human cargo transport device of claim 1, further comprising blocking and securing means configured for blocking the telescopic rod at least in expanded state.

14. The collapsible self-supporting human and/or non-human cargo transport device of claim 13, wherein the blocking and securing means comprises a lock pin.

15. The collapsible self-supporting human and/or non-human cargo transport device of claim 1, wherein the collapsible cargo securing means comprises a security transport net.

* * * * *